United States Patent
George et al.

(10) Patent No.: US 11,113,700 B2
(45) Date of Patent: Sep. 7, 2021

(54) METHOD AND APPARATUS FOR ASSOCIATING DEVICE USER IDENTIFIERS WITH CONTENT PRESENTATION AND RELATED EVENTS

(71) Applicant: Adobe Inc., San Jose, CA (US)

(72) Inventors: William Brandon George, Pleasant Grove, UT (US); Kevin G. Smith, Lehi, UT (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 13/669,155

(22) Filed: Nov. 5, 2012

(65) Prior Publication Data

US 2014/0129322 A1 May 8, 2014

(51) Int. Cl.
*G06Q 30/02* (2012.01)
(52) U.S. Cl.
CPC .................. *G06Q 30/02* (2013.01)
(58) Field of Classification Search
CPC .................. G06Q 30/0246; G06Q 30/02
USPC ...................................... 705/14.45
See application file for complete search history.

(56) References Cited

U.S. PATENT DOCUMENTS

| | | | |
|---|---|---|---|
| 4,858,000 A | 8/1989 | Lu | |
| 6,467,089 B1 | 10/2002 | Aust et al. | |
| 7,239,981 B2 | 7/2007 | Kolessar et al. | |
| 7,647,605 B2 | 1/2010 | Lu et al. | |
| 7,738,881 B2 * | 6/2010 | Krumm | G01C 21/28 340/539.21 |
| 7,945,928 B2 * | 5/2011 | Matz et al. | 725/46 |
| 8,023,882 B2 | 9/2011 | Croy et al. | |
| 8,280,889 B2 | 10/2012 | Whitman | |
| 9,451,308 B1 * | 9/2016 | Liu | H04N 21/26241 |
| 2002/0059577 A1 | 5/2002 | Lu et al. | |
| 2003/0037333 A1 | 2/2003 | Ghashghai et al. | |
| 2008/0281687 A1 * | 11/2008 | Hurwitz | G06Q 30/02 705/14.1 |
| 2009/0305680 A1 * | 12/2009 | Swift et al. | 455/414.1 |
| 2011/0060652 A1 * | 3/2011 | Morton | H04W 4/043 705/14.58 |
| 2011/0145056 A1 | 6/2011 | Sullivan et al. | |
| 2012/0016733 A1 * | 1/2012 | Belvin et al. | 705/14.41 |
| 2012/0116861 A1 * | 5/2012 | Dobyns | 705/14.34 |
| 2012/0124605 A1 | 5/2012 | Praden | |
| 2013/0041761 A1 * | 2/2013 | Voda | G06Q 30/0259 705/14.68 |

(Continued)

*Primary Examiner* — Azam A Ansari
(74) *Attorney, Agent, or Firm* — Kilpatrick Townsend & Stockton LLP

(57) ABSTRACT

Creating an association of a user identifier linked to a mobile device with the presentation of content. A computing device may create an association between the presentation of content on a presentation device and a user identifier linked to a mobile device in response to the presentation of content. The computing device may detect a presentation event which indicates a connection between a user identifier linked to the mobile device and the presentation of content. The computing device may then send a presentation event message to a network server. Subsequently, a predefined event may be detected via the mobile device, and in response, a predefined event message, including the user identifier linked to the mobile device and the predefined event, may be sent to the network server.

17 Claims, 9 Drawing Sheets

(56) References Cited

U.S. PATENT DOCUMENTS

2014/0032304 A1* 1/2014 Kent ..................... G06Q 30/02
705/14.43

* cited by examiner

| | Video Content | Views | Store Visits | Purchases |
|---|---|---|---|---|
| 610 | Fast food chain burger ad | 94,112 | (Fast food chain) 498 | (burger) 410 |
| 620 | Cell phone product placement (during video content) | 79,025 | (Cell phone store) 102 | (cell phone) 15 |
| 630 | Interview with Music Celebrity | 55,242 | (Record store) 14 | (CD) 11 |

METHOD AND APPARATUS FOR ASSOCIATING DEVICE USER IDENTIFIERS WITH CONTENT PRESENTATION AND RELATED EVENTS

BACKGROUND

Presentation of different media content, such as television or radio, has long been underwritten by and used for the promotion of a variety of different products and services. Marketers rely upon audience measurement techniques to determine the particular time, date, and location for presenting promotional media content alongside measured media content, thus increasing the likelihood that the audience of the measured media content will also be the audience for the promotional media content. Greater accuracy in audience measurement techniques allows marketers greater ability to present promotional content to a specific target audience. Conventional audience measurement techniques often rely upon the audience themselves to manually record the media content presented to them, creating the possibility for error and subjectivity. Along with these manual audience measurement techniques, signal monitors are also typically used to determine a particular signal or frequency being presented to an audience.

In order to measure the impact of promotional media content upon audience members, marketers typically conduct surveys and other forms of audience research to determine whether audience members, to whom promotional media content has been presented, make purchasing decisions, such as viewing a product in store or buying a product via the Internet, in response to the promotional media content. As noted above, these types of surveys are susceptible to error and subjectivity. With the rise of digital technology, such as a Digital Video Recorder (DVR), allowing audience members to select when, where, and which portions of content may be presented, the difficulty of the ability of conventional audience measurement techniques proves even more complex.

SUMMARY

Various embodiments of creating an association of a user identifier linked to a mobile device with the presentation of content are described. In some embodiments, a computing device may create an association between the presentation of content on a presentation device and a user identifier linked to the mobile device in response to the presentation of content. The computing device may detect a presentation event which indicates a connection between a user identifier linked to the mobile device and the presentation of content. The computing device may then send a presentation event message to a network server. Subsequently, a predefined event may be detected via the mobile device, and in response, a predefined event message, including the user identifier linked to the mobile device and the predefined event, may be sent to the network server.

DETAILED DESCRIPTION OF EMBODIMENTS

Figure 1:
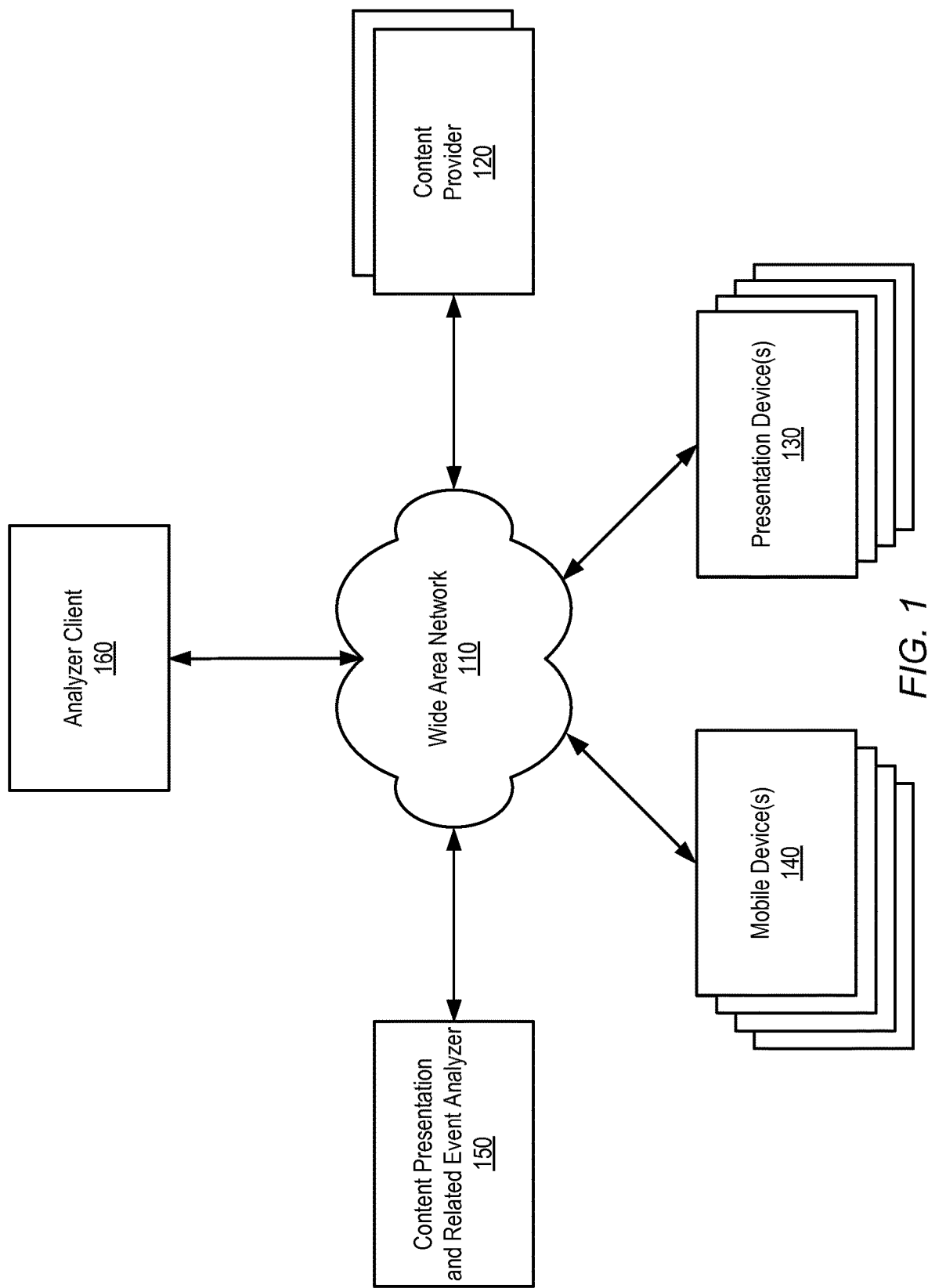
FIG. 1 illustrates a content presentation and related event analysis environment, according to some embodiments.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of creating an association of a user identifier linked to a mobile device with the presentation of content are described herein. In some embodiments, a presentation device, such as an internet protocol television (IPTV) device, may display, perform, or otherwise playback media content. A mobile device or the presentation device may detect that media content has been played for an audience. A user identifier, such as a content purchase account, residing on or used by the mobile device may then be associated with the content and sent to a server collecting user identifiers of mobile devices that detect the presentation of content. After reporting that the user identifier has now been presented with the content, other predefined events, such as a visit to the retail store promoted in the content, or a purchase from the retail store, associated with the user identifier may be reported as events to the server. Reports may then be generated which show user identifiers presented with content, as wells as whether any subsequent events have occurred associated with the user identifier.

Generally, media publishers, such as advertisers, marketers, television and radio studios, video game developers, market/consumer researchers, and analysis services, as well as other entities that create, develop, produce, or monitor content for presentation for an audience (referred to collectively as "content providers") and its subsequent effects may implement one or more various embodiments of creating an association of a user identifier linked to a mobile device with the presentation of content. Content providers may wish to employ a third-party content presentation and related event analyzer, or implement content presentation and related event analysis for themselves in order to collect and analyze content presentation data for content presented on a presentation device and related event. Content providers may define or decide what content to collect content presentation data for. For example, a television network may wish to collect and analyze content presentation data about a particular television show, or a toy store may wish to collect content presentation data and related event about a particular commercial for the toy store. To facilitate collecting and analyzing content presentation and related event, an association between a user identifier linked to a mobile device and the presentation of content may be reported to a network server.

Content presentation and related event may, in various embodiments, include presentation event messages and predefined event messages. These event messages include a user identifier linked to a mobile device. Event messages may also describe the presentation time, place (e.g., location of the presenting presentation device), mode (e.g., live or previously recorded), format (e.g., audio, visual, interactive media, or some combination thereof), data for the presented content, as well as numerous other types of information useful for marketing research, such as audience member data (e.g., age, gender, socio-economic status, profession, etc.) associated with the user identifier, or other predefined data, such as the location of a mobile device linked to the user identifier, or a purchase associated with a user identifier. A user identifier may be an identifier, such as an alpha-numeric identifier or other form of symbol, data, or signature capable of identifying a user. The user may be an owner, operator, or possessor of a mobile device, and may have an account, such as purchase account, or other record capable of recording transactions involving the user identifier.

In some embodiments, to create an association between content presented on a presentation device and a user identifier linked to a mobile device, a computing device, such as a presentation device or a mobile device, may detect a presentation event indicating a connection between the user identifier linked to a mobile device and the presentation of the content on a presentation device. Various different methods, discussed below, may be used to detect a presentation event, such as by identifying a signal based on a particular signal pattern (e.g., acoustic fingerprinting) or receiving an identifier indicating the presentation of content in an identified signal. A presentation event message may then be sent to a network server.

Subsequently, a computing device may detect a predefined event via the mobile device. A predefined event may be any event related to or associated with content. For example, a predefined event may, in some embodiments, include a determination that the location of the mobile device is within the bounds of a previously defined geographic area. The geographic area may be related to presented content. A fast food chain, for instance, may present commercials advertising a particular menu item and create a predefined event that detects when a mobile device enters one of the physical locations of the fast food chain. In at least some embodiments, a predefined event may also include a purchase or other order, contract, rental, or sale related to content. For example, a clothing retailer may insert product placements into an episode of a television show and create a predefined event that detects when the user identifier linked to the mobile is associated with a purchase, such as via the retailer website, for one of the products placed into the episode. In response to detecting a predefined event, a computing device may send a predefined event message to a network server, such as a content presentation and related event analyzer described below with regard to FIG. 1.

In various embodiments, a content presentation and related event analyzer, described further below with regard to FIG. 1, may receive presentation event messages that indicate a connection between a user identifier linked to a particular mobile device and presentation of content on a presentation device. The content presentation and related event analyzer may then record the connection between the presentation of the content and the user identifier linked to the mobile device as indicated by the presentation event message. Subsequently, the content presentation and related event analyzer may also receive predefined event messages that include the user identifier linked to a particular mobile device. The content presentation and related event analyzer may determine that the predefined event message indicates a predefined event. Based on the user identifier indicated in the received predefined event message, the content presentation and related event analyzer may determine one or more presentations of content connected to the user identifier and connect the predefined event with the one or more presentations of content connected to the user identifier. For example, a user identifier may be connected to five presentations of a particular fast food commercial and the predefined event may be a current location of the mobile device within one of the fast food locations. Based on the user identifier, the content presentation and related event analyzer may determine the five presentations of the particular fast food commercial and connect the current location of the mobile device within a location of the fast food chain event with the five commercial presentations. The connection may be stored at the content presentation and related event analyzer or at another accessible storage location. In some embodiments one or more views of recorded connections may be generated. These views may be specified based on a user identifier or particular content.

Embodiments of creating an association of a user identifier linked to a mobile device with the presentation of content may be implemented in any device, system or application that provides, collects, or analyzes content presentation and related event. An example category of application in which embodiments may be implemented is content presentation analytics software, such as software as a service (SaaS) content analytics tools, or content analytics tools locally implemented, or more generally in applications in which measure, detect, or otherwise record an association between a user identifier linked to a mobile device and presented content. Embodiments of creating an association of a user identifier linked to a mobile device with the presentation of content may, for example, be implemented as a module of a larger presentation content and related event application. Specific examples of applications or technologies in which embodiments may be implemented include, but are not limited to, Adobe® SiteCatalyst® technology. "Adobe", and "SiteCatalyst" are either registered trademarks or trademarks of Adobe Systems Incorporated in the United States and/or other countries.

Figure 9:
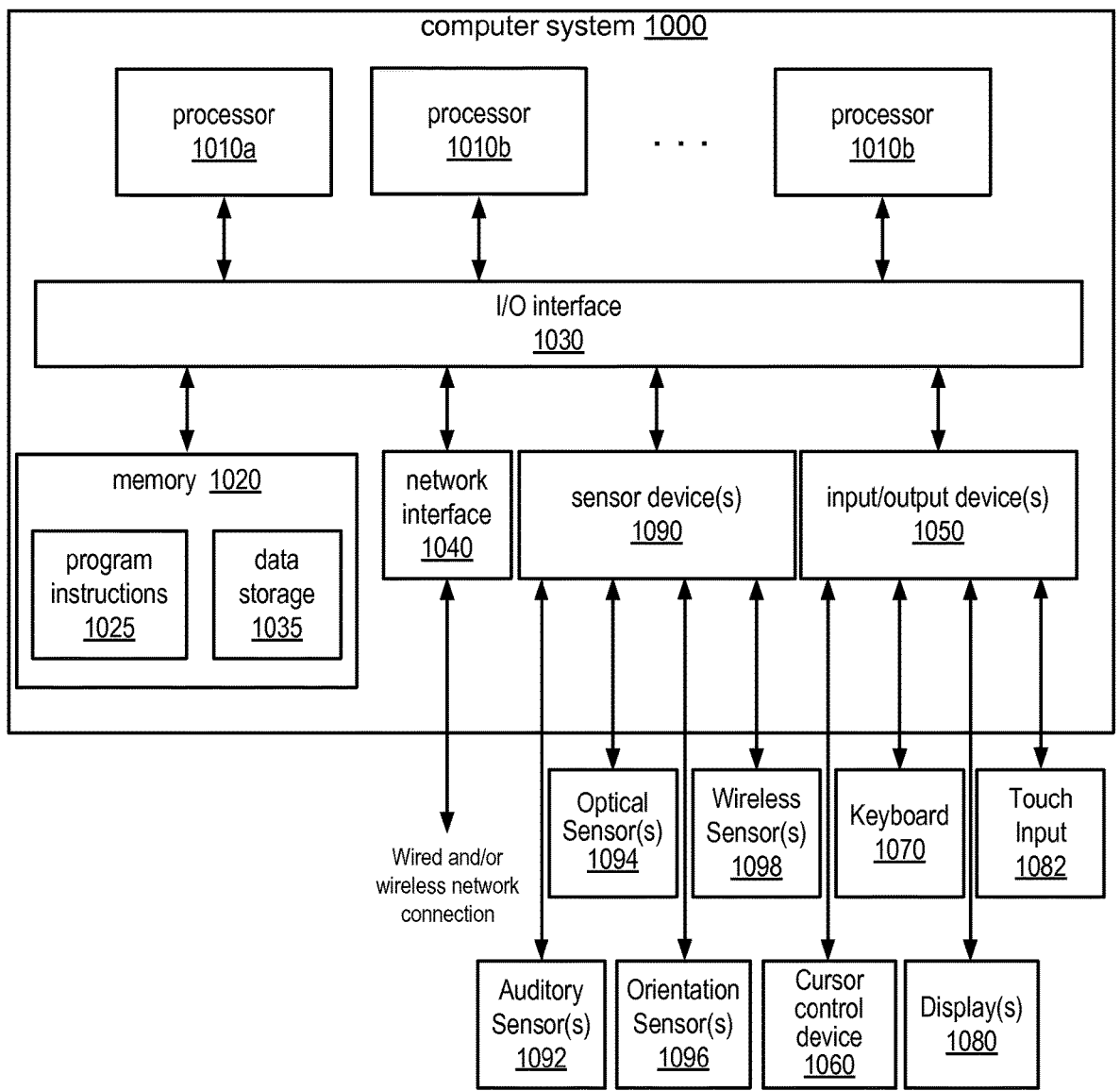
FIG. 9 illustrates an example computer system, according to some embodiments.

Embodiments of creating an association of a user identifier linked to a mobile device with the presentation of content may be implemented and performed by a module or modules, such as those described below with regard to FIGS. 7A and 7B, implemented by program instructions stored in a computer-readable storage medium and executable by one or more processors (e.g., one or more CPUs and/or GPUs). An example computer system on which embodiments may be implemented is illustrated in FIG. 9.

Content Presentation and Related Event Analyzer Environment

Various embodiments of creating an association of a user identifier linked to a mobile device with the presentation of content may be implemented in content presentation data collection environment, such as illustrated in FIG. 1. A content presentation and related event analyzer 150 may obtain various content presentation data, such as various content analytics data or audience measurement data, for one or more portions of content distributed by a content provider 120 and presented to an audience on multiple presentation devices 130. The content presentation data, as discussed above, may describe various presentation information for content associated with a mobile device 140. Content presentation data may be recorded or reported by mobile device 140 or presentation device 130 to content presentation and related event analyzer 150. Content presentation and related event analyzer 150 may generate for display and/or send one or more views of the content presentation data to an analyzer client 160 for further processing.

A content provider 120 may be a system, network, e.g. such as Internet Protocol Television (IPTV), network of system nodes, or any other communication infrastructure, such as radio signal, satellite signal, or cable, configured to distribute or deliver one or more forms of content for presentation to an audience. A content provider 120 may be the creator, owner, or publisher of content. Alternatively, the content provider 120 may be contracted, directed, or otherwise enabled by the creator, owner, or publisher of content to distribute content for presentation to an audience. Although FIG. 1 depicts content provider 120 communicating over wide area network (WAN) 100 to various other systems and devices, content provider 120 may communicate through various other mediums, such as broadcast signal, satellite signal, cable signal, or other media communication technology. As a variety of content distribution technologies are well-known to those of ordinary skill in the art, the examples given above are not intended to be limiting.

Content may be one or more portions of media, such as segments of audio, video, or interactive media distributable by a content provider 120. Content may, for example, be a commercial, an interview segment, a music video, movie scene, audio track, or game. Generally, in some embodiments, different content may be presented in sequence, interleaved, or alongside other content. For example, in some embodiments, commercials or other advertisement content may be presented in between scenes of a particular television show. Alternatively, in some other embodiments, for instance, a particular portion of a video scene or a portion of a song may be part of a larger piece of content that runs contiguously with other portions of the same larger piece of content (e.g. a particular catchphrase, theme song, etc.). Particular definitions of content are subject to wide range of granularity, from entire programs or commercials to particular catchphrases, images, sounds or other media.

A content creator, owner, publisher and/or content provider 120 may define content to measure content presentation data. Such definitions may include identification information, such as unique identifiers, auditory/visual signatures, or other metadata (e.g., time presented, length, keywords) that allows for the identification of content. In at least some embodiments, the particular definitions of content may be provided to content presentation and related event analyzer 150, presentation device 130, and/or mobile device 140. For example, an analyzer client 160 may be utilized by a content creator, owner, publisher, or content provider 120 to communicate particular content definitions to the content presentation and related event analyzer 150 for measurement.

A presentation device 130, may receive content from a content provider 120 over wide area network 110, or other communication infrastructure or protocol, such as this discussed above with regard to content provider 120. A presentation device 130 may present content or portions of content utilizing audio, video, or other communication mediums to present distributed content to an audience. For example, video content may include auditory as well as visual content. A presentation device may be composed of one or more devices capable of presenting such combined media content, such as a television that includes a display screen as well as integrated speakers. A variety of devices may be coupled together as one or more components of a presentation device, such as televisions, or other electronic displays, video projectors and screens coupled with sound and speaker systems, as well as devices capable of communicating with content provider 120 over wired or wireless networks, such as WAN 110, or other communication infrastructures, such as those discussed above. Examples include, but are not limited to, signal receivers, digital video recorders (DVRs), media players (e.g., blue-ray disc, compact disc (CD), etc.) gaming consoles, or any other device, such as described below with regard to FIG. 9, capable of receiving, processing, and presenting content to an audience. As numerous configurations of devices for presenting content are well-known to those of ordinary skill in the art, the above examples are not intended to be limiting.

Figure 2:
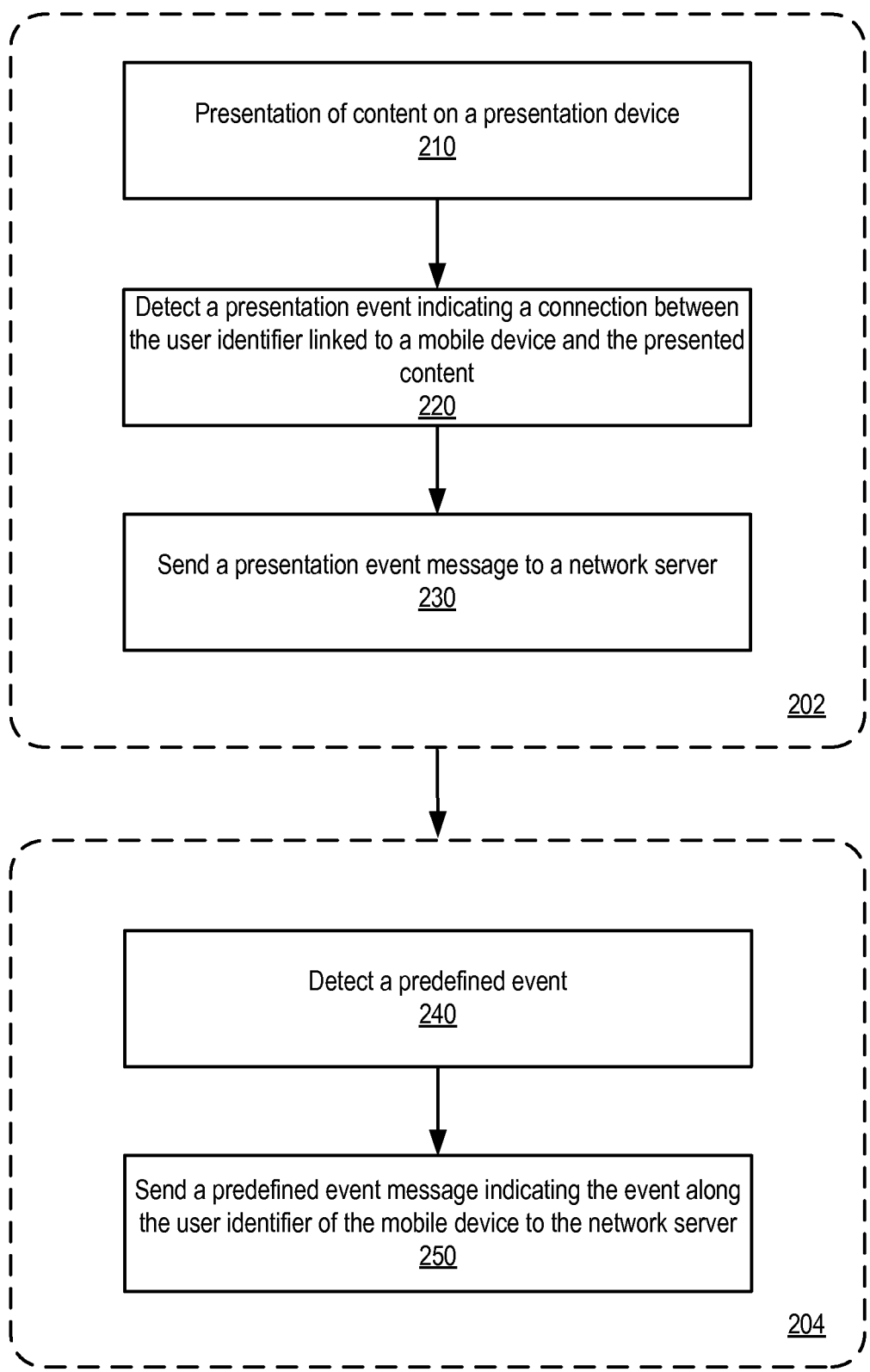
FIG. 2 illustrates a workflow of creating an association of a mobile device with the presentation of content, according to some embodiments.

In some embodiments, presentation device 130 may be configured to create an association of a user identifier linked to a mobile device with the presentation of content implementing the various methods discussed below with regard to FIG. 2 and a module configured to implement the methods, such as discussed below with regard to FIG. 7B. For example, the presentation device 130 may be an internet protocol television (IPTV) that allows a mobile device 140 to identify or synchronize with the presentation device, sending the user identifier linked to the mobile device 140 to the IPTV device, which may then record associations between the user identifier and content presented by presentation device 130. Presentation device 130 may also detect a presentation event indicating a connection between the user identifier linked to mobile device 140 and the presentation of the content. Various content presentation data associated may also be obtained along with detecting the presentation of content, such as when the content was presented or the type of presented content (e.g., audio, video, etc.). Presentation device 130 may send presentation event messages including content presentation data to a content presentation and related event analyzer 150.

Mobile device 140 or other computing device may be one of a variety of different types of mobile computing devices, such as mobile phones, tablet computers, personal digital assistants (PDAs), laptops, desktop computers, or other systems, such as system 1000 described below with regard to FIG. 9. A mobile device 140 may, in various embodiments, be configured to create an association of a user identifier linked to the mobile device with the presentation of content, implementing the various methods discussed below with regard to FIG. 2 and a module configured to implement the methods, such as discussed below with regard to FIG. 7A. In some embodiments, a mobile device may be linked to a particular user identifier. This user identifier may identify the particular owner, operator, or current possessor of the mobile device and be associated with particular content presented on presentation device 130. In at least some embodiments, mobile device 140 may detect a presentation event indicating a connection between the user identifier linked to the mobile device and the presentation of the content on the presentation device along with various content presentation data associated with the presented content, such as when the content was presented and what medium presented the content (e.g., audio, video, etc.), and/or any other value or metric pertaining the presentation of content and predefined events. Mobile device 140 may send presentation event messages indicating connections between user identifiers and content which may also include content presentation data to a content presentation and related event analyzer 150. Similarly, mobile device 140 may send predefined event messages indicating a predefined event along with the user identifier linked to the mobile device 140.

Mobile device 140 may also communicate with one or more mobile device services utilizing a variety of different communication infrastructures or protocols, such as WAN 110. Mobile device services may, in some embodiments, facilitate multiple different mobile device functions. For instance, mobile device services may provide location services which help to determine the current location of a mobile device. In another example, mobile device services may facilitate commercial transactions, such as placing orders or making payments.

Figure 5:
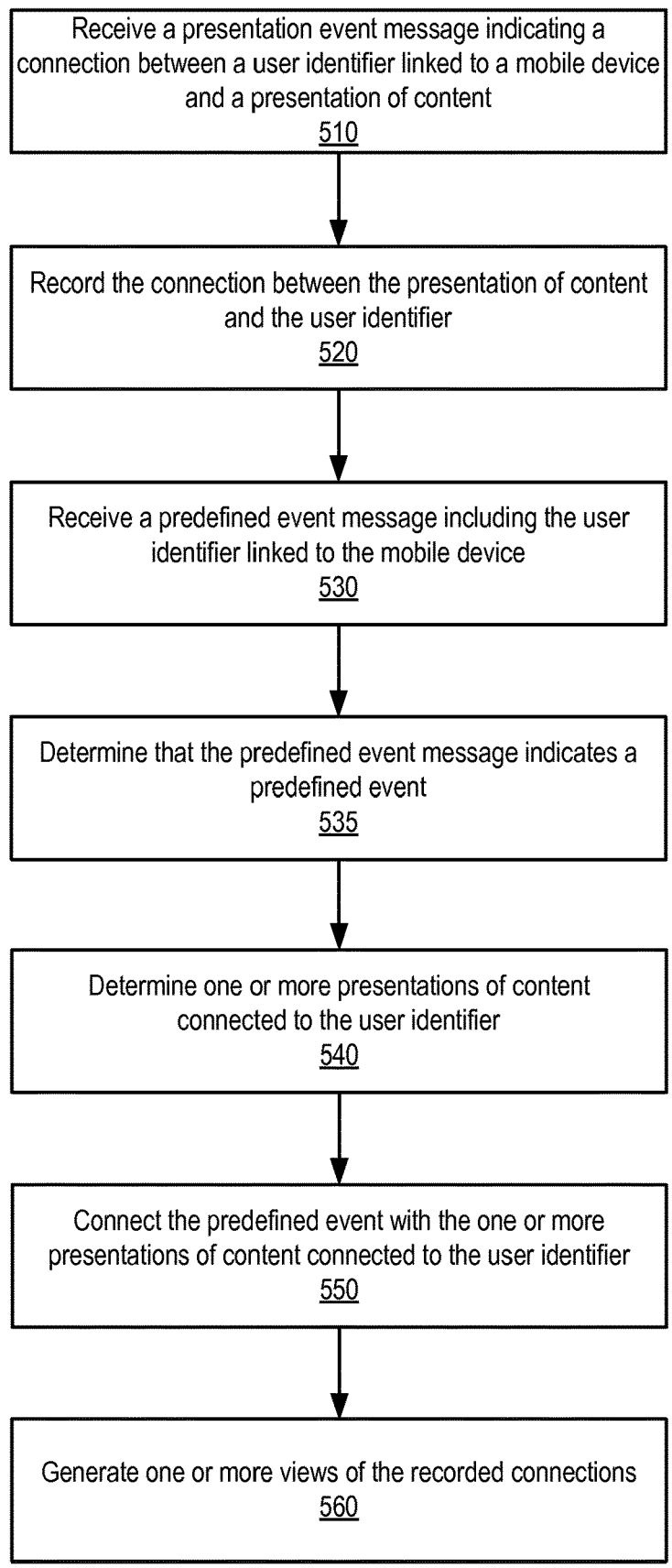
FIG. 5 illustrates a workflow of creating associations of received content presentation data, according to some embodiments.

In some embodiments, content presentation and related event analyzer 150, described below in further detail with regard to FIGS. 5 and 8, may be implemented on one system or network server, such as computer system 1000 described below in FIG. 9, or on a plurality of systems or servers, such as one or more nodes of a distributed system. For example, content presentation and related event analyzer 150 may be implemented as part of a third-party service, such as SaaS content presentation data measure service, which collects content presentation data for a content owner, publisher, distributor, provider, or other interested party. Alternatively, in another example a content presentation and related event analyzer may be implemented directly by the content owner, publisher, distributor, provider, or other interested party of the content to be measure.

Content presentation and related event analyzer 150 may receive multiple different messages, such as presentation event messages or predefined event messages, from multiple different devices, such as presentation devices 130 and mobile devices 140, indicating connections between user identifiers linked to mobile devices 140 and multiple presentations of content for multiple content providers 120. In some embodiments, these messages may include data in addition to the user identifier and the presentation of content or other predefined event data, such as data pertaining to the user identifier (e.g., demographic information). In some embodiments, content presentation and related event analyzer 150 may record the connections indicated by the messages, such as the connection between the presentation of the content and the user identifier linked to the mobile device indicated by presentation event messages. In at least some embodiments, content presentation and related event analyzer 150 may connect a predefined event to one or more presentations of content, based on the user identifier indicated in a predefined event message. Content presentation and related event analyzer 150 may generate one or more views of the recorded connections and display or send these views to an analyzer client 160, over a wired or wireless network, such as WAN 110, or other communication method or protocol. Content presentation and related event analyzer 150 may, in some embodiments, provide a user interface for analyzer client 160 to facilitate communication with analyzer client 160. In some embodiments, the generated view of recorded connections may be sent to analyzer client 160 in response to a request.

Analyzer client 160 may be implemented on a desktop computer, laptop computer, tablet computer, mobile phone, personal digital assistant (PDA), or any other electronic or computing device, such as computer system 1000 described below with regard to FIG. 9, configured to request, view, or receive generated views of content analytics data from content analytics service 150. Generally an analyzer client may be operated by an entity, such as a content owner, producer, publisher, distributor, provider, or other interested party that determines the presentation of content, such as when commercial advertisements are aired and during what program the commercial advertisements are aired. In some embodiments, a content publisher or owner (e.g., a chemical company that publishes cleaning liquid commercial) may operate an analyzer client 160. Similarly other intermediary organizations or third-party companies may operate an analyzer client 160 on behalf of the content owner or publisher. Analyzer client 160 may be implemented in a browser or other user interface that allows the analyzer client 160 to communicate with content presentation and related event analyzer 150 which collects and generates views of recorded connections between user identifiers linked to mobile devices and presented content. However, in at least some embodiments, analyzer client 160 may be a locally stored or executed application on a system, such as system 1000, and communicating with content presentation and related event analyzer utilizing various communication methods and protocols or application programmer interfaces (APIs). In various embodiments, content presentation and related event may be received from content presentation and related event analyzer 150 via wide area network 110 for further processing or viewing.

Workflow of Associating a User Identifier with Presented Content

In various embodiments, a presentation device, such as presentation device 130 discussed above with regard to FIG. 1, a mobile device, such as mobile device 140 discussed above with regard to FIG. 1, or other computing device, such as a server, may implement creating an association of a user identifier linked to a mobile device with the presentation of content. FIG. 2 illustrates a workflow of creating an association of a user identifier linked to a mobile device with the presentation of content, according to some embodiments, that may be implemented by these devices. Note that in the following discussion the terms presentation device or mobile device may be used to describe a presentation device or mobile device performing the illustrated workflow, however such terms are not intended to be limiting as to the numerous one or more other computing devices capable of implementing the illustrated workflow.

A presentation device may, in some embodiments, present content on a presentation device 210. Content, as discussed above, may be any form of audio, video, or other form of media, and the presentation of such may take many different forms. For example, content may be a television commercial displayed during a television show or program (e.g., a sporting event). Presentation of content may occur at a time different than the time it was original distributed, such as video replayed at a later time using a Digital Video Recorder (DVR), or may be available upon user request through a media player (e.g., DVD, Blue-ray, CD Player, or gaming console).

In response to the presentation of content on a presentation device, in order to create an association between the presentation of the content and a user identifier linked to a mobile device, a presentation device or a mobile device may detect a presentation event 220. A presentation event may indicate a connection between a user identifier linked to a mobile device and the presented content. For example, a connection between the user identifier and the presented content may demonstrate a strong likelihood that the user of the mobile device linked to the user identifier observed, listened, or interacted with the content presented.

A presentation device may detect a presentation event 220 that indicates a connection between a user identifier linked to a mobile device and the presented content in various ways. In some embodiments, the presentation device may receive a user identifier associated with a mobile device, such as by an automatic or manual message exchange between the mobile device and the presentation device over, for example, a wireless network or using some other communication method. Alternatively, a user may manually input the user identifier linked to a mobile device into the presentation device, such as by an interactive menu or interface provided by the presentation device. When a portion of content is presented on the presentation device that is being measured for content presentation data, the presentation device may detect that the content has been presented and connect the received user identifier with the presented content. For example, a mobile device user may have a user identifier linked with her mobile device. When setting up an IPTV device, the user may synchronize her mobile device with the IPTV device. When certain commercials or programs are presented to on the IPTV device, the IPTV device may log the content presented and the user identifier.

Figure 3:
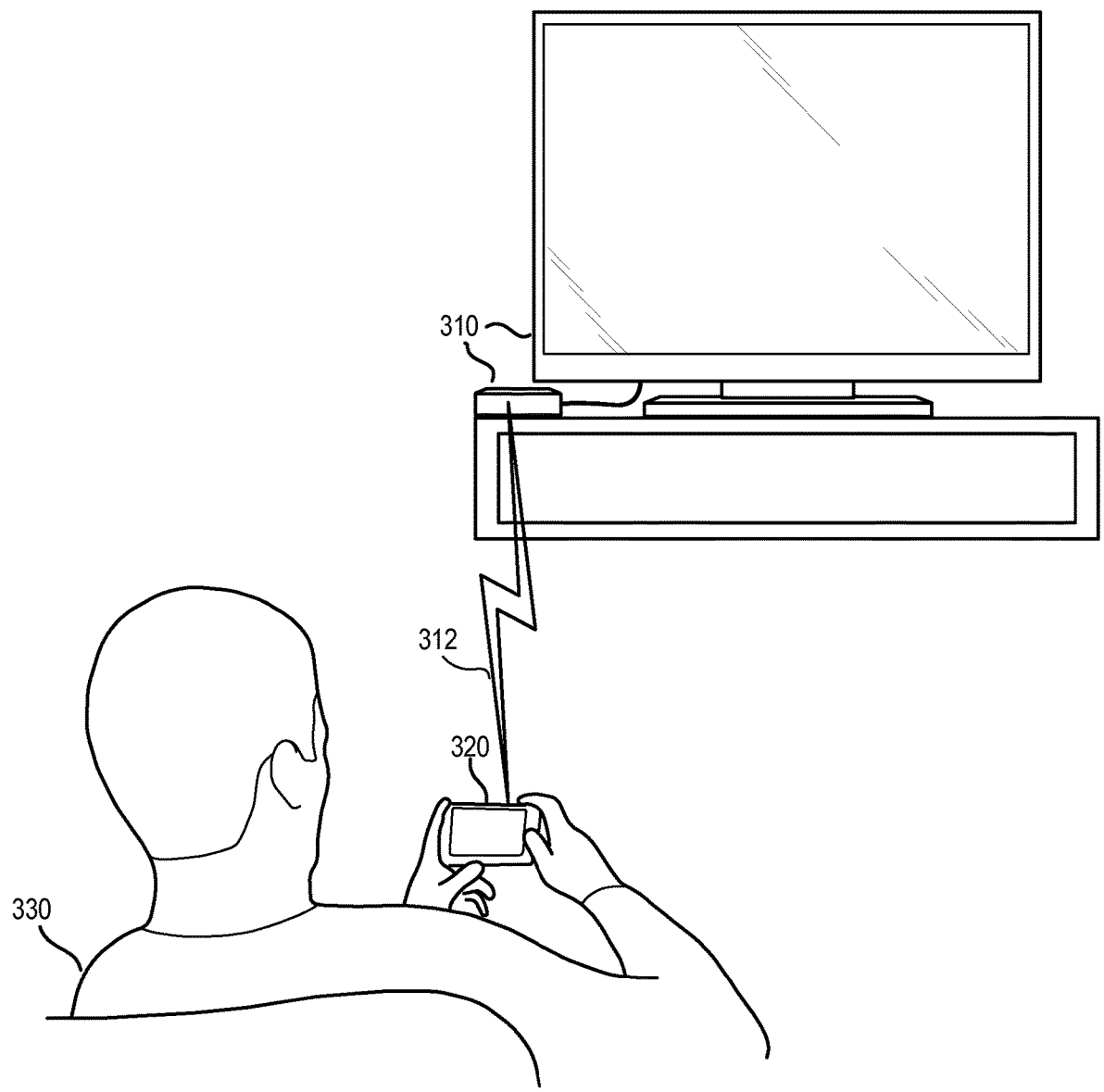
FIG. 3 illustrates an example of detecting a presentation event on a mobile device, according to some embodiments.

In at least some embodiments, a presentation device may detect one or more presentation events for one or more mobile devices. For example, FIG. 3 illustrates an example of detecting a presentation event, according some embodiments. Presentation device 310 may broadcast and receive one or more signals 312. These signals may include information or instructions, such as a message, for mobile devices within range of detecting the signals 312. Presentation device 310 may broadcast or receive these signals through a variety of different communication methods, including, but not limited to wireless signals (e.g., over a wireless network, Bluetooth, infrared) or other signals detectable via sensors, such as wireless sensors 1098 or optical sensors 1094 described below in FIG. 9. Additionally, in some embodiments the type, strength, frequency of broadcast or other signal broadcast condition may be determined to define a particular range or distance for which the signal may be detected by a mobile device. For example, certain signal technologies may require line-of-sight or close proximity for a mobile device to detect the signal. Thus, in such a configuration, detection of events may indicate that a mobile device was a certain distance away from the presentation device, or in this example was "in sight" of the presentation device. In at least some embodiments, the presentation event message may indicate either the method of presentation event detection or a particular distance or range that the mobile device was detected within such that later analysis of the recorded presentation event may be able to discern different levels of likelihood that a user was present during the presentation of content based on the distance of the mobile device. Continuing with the above example, the presentation event message sent indicating the presentation event detected via the infrared line-of-sight technology may indicate in further analysis that an owner, operator, or possessor of the mobile device had a high likelihood that the user was presented with the content. For instance, if the mobile device detects a television commercial via infrared signal requiring line-of-sight, then there is a higher likelihood that the user was in sight, and thus viewed, the television commercials. Various other techniques may be used to make similar determinations when detecting presentation events, and thus, the above example is not intended to be limiting. In at least some embodiments, signal may include a request for certain information from a mobile device. For example, using a Bluetooth communication method, presentation device 310 may request registration of user identifiers from mobile devices that receive the signal 312. Mobile device 312 may respond with the requested user identifier, and may also include other requested information. In some embodiments, user 330 may acknowledge or allow the registration of the user identifier for mobile device 320. Similar to the detection method described above, when presentation of content is detected on the presentation device 310, the presentation device 310 may record the connection between the presented content and the user identifier of the mobile device 320 registered with the presentation device 310. Although only one mobile device 320 is depicted in FIG. 3, multiple mobile devices may be detected, and as such FIG. 3 is not intended to be limiting.

A mobile device 320 may also detect a presentation event 220. As discussed above, the presentation device 310 may broadcast signals 312 detectable by the mobile device 320. For example, presentation device 310 may broadcast one or more infrared signals 312, which mobile device 320 may detect. Signals 312 may include content presentation data to indicate to the mobile device 320 that content has been, is currently, or will be presented on presentation device 310. Signals may transmit packaged content presentation data according to a variety of different standard or customized messaging formats. Mobile device 320 may identify the signal to detect the indication of the presentation of content on presentation device 310, such as by identifying a particular presentation event message broadcast by the presentation device 310. Signals 312 may also include further data associated with the presented content, such as various forms of companion data (e.g., further content, information, or data used for providing further content) or information used to obtain companion data. Mobile device 320 may detect signals 312 using a variety of sensors or devices, such as wireless sensors 1098 and optical sensors 1904 discussed below with regard to FIG. 9, capable of receiving and processing signals according to their various technologies. Again, as discussed above, type of signal, and method of detection may provide information to a content presentation and related data analyzer that the user of the mobile device was within a certain range or distance from the presentation of content, providing information about the likelihood that the user was actually presented with the content.

In some embodiments, mobile device 320 may detect a presentation event 220 by identifying signals 320 received from presentation device 310 to detect the presentation of content on the presentation device 310. In some embodiments, the signal received from the presentation device 310 may be an audio signal. The mobile device 320 may implement software, hardware, or some combination thereof capable of recognizing audio patterns in the audio signal, sometimes referred to as acoustic fingerprinting. For example, a mobile device may implement an application configured to "listen" during the presentation of content, such as a television program, and compare portions of the audio signal received by "listening" to patterns of signal identified as certain content. In this way, the application may detect the presentation of content by identifying the audio signal presented as part of that content, and thus detect a presentation event. Acoustic fingerprinting and similar recognition techniques are well-known to those of ordinary skill in the art, and therefore, a variety of different methods are envisioned for identifying audio signals based on audio signal recognition. Similarly, mobile device 320 may implement software, hardware, or some combination thereof capable of identifying the presented videographic signals of presentation device 310 to detect a presentation event. For example, mobile device 320 may capture through an optical sensor a single or multiple images of content which the device may then identify through visual recognition software implemented on the mobile device 320. Mobile device 320 may rely upon mobile device services to obtain information or further processing of signals to identify the signal. For example, a mobile device service may maintain a database of the signals for content, which may be provided to a mobile device in order to identify a signal.

In at least some embodiments, a computing device, whether a mobile computing device, such as a laptop, or a stationary computing device, such as a desktop computer may be configured to detect a presentation event 220. Similar methods to the ones discussed above with regard to mobile device 320 may be implemented. For example, a desktop computer may, using various the communication methods discussed above, register a user identifier with presentation device 310. Additionally, as also discussed above, a desktop computer or laptop device may also by identifying signals 320 received from presentation device 310 to detect the presentation of content on the presentation device 310, for instance by "listening" for the presentation of content.

After detecting a presentation event 220, a mobile device or a presentation device may, in some embodiments, send a presentation event message 230 to a network server. Presentation event messages may include an indication connecting a user identifier linked to the mobile device with the presentation of content. Many different formats of messaging and communication protocols, both standard, such as Hypertext Transfer Protocol (HTTP), or customized, may be used to package the information indicated in presentation event messages. Presentation event messages may also include additional presentation content data, such as when the content was presented, on what presentation device, or any other data discussed above with regard to content presentation data.

In some embodiments, a mobile device or presentation device may store local records of the presentation event messages, or the information included in the presentation event messages. The presentation event messages may be sent as presentation events are detected, at certain periodic or aperiodic intervals, in response to requests, or any time or pattern suitable for the collection of content presentation data. Presentation event messages may also be sent in batches with other presentation event messages, or with other types of messages such as predefined event messages.

Subsequent to creating an association between the presentation of content and a user identifier linked to a mobile device, the mobile device may detect a predefined event 240. A predefined event may be any action performed via the mobile device or the user identifier linked to the mobile device that may be attributed to the presentation of content. Some examples include, but are not limited to, detecting when the mobile device is located within a certain previously defined area (e.g., a geo-fence), a purchase made via the mobile device (e.g., using near field communications (NFC)) or associated with the user identifier linked to the mobile device, determining a current device location, postings to social networks, sending text messages, downloading or viewing an application, or viewing a mobile website. Information concerning any of these events may be predefined for an application or other implementation of hardware and/or software to detect an occurrence of these events. The content provider, content presentation and related event analyzer, or other party implementing various embodiments of creating an association of a user identifier linked to a mobile device with the presentation of content may communicate the information necessary to detect these events to a mobile device. For example, a mobile device may implement a content presentation and event module, such as described below with regard to FIG. 7A, which comes with the definitions for these predefined events preinstalled or is capable of receiving or updating these definitions from a content presentation and related event analyzer or other system.

Figure 4:
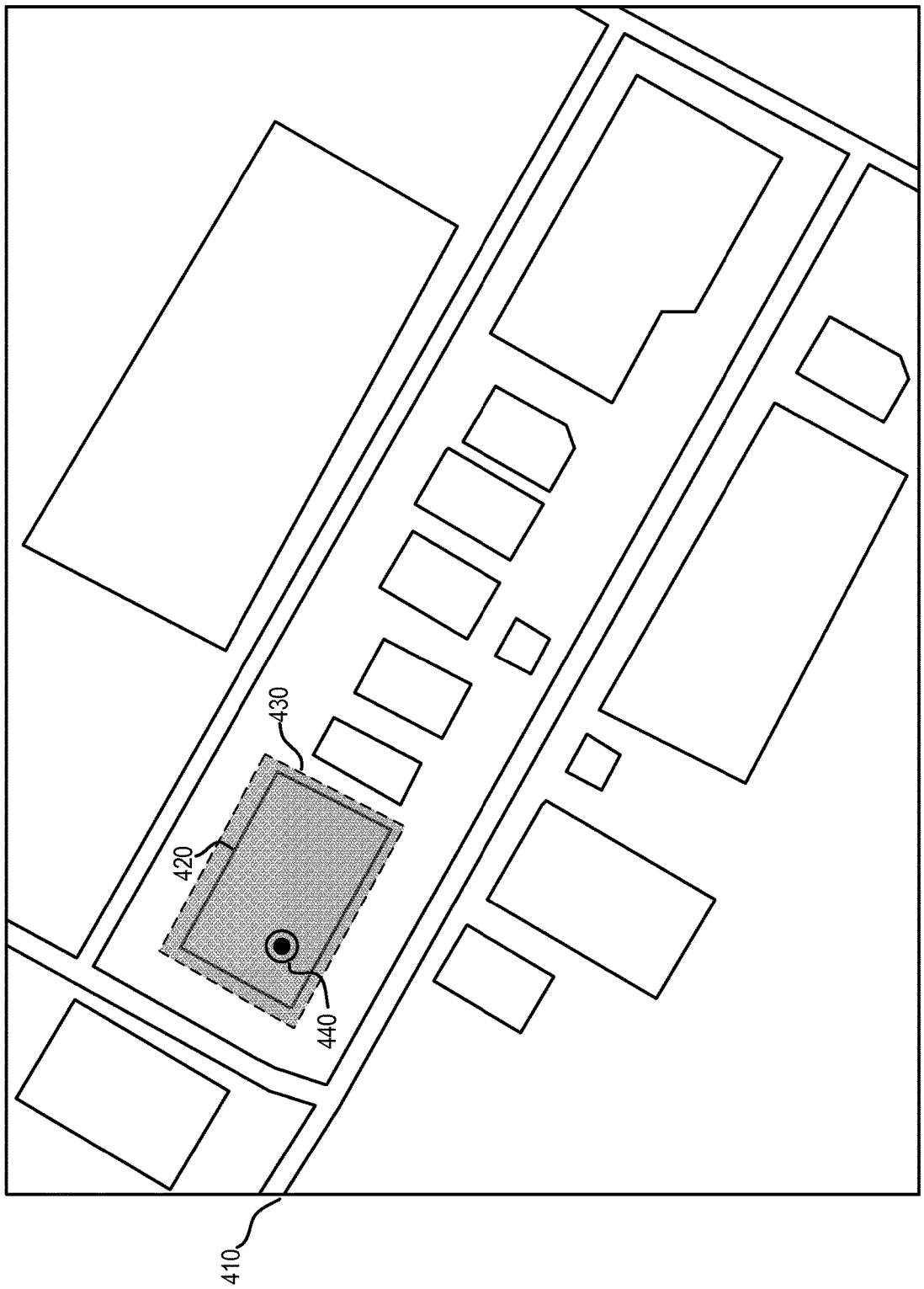
FIG. 4 illustrates an example of previously defined geographic area, according to some embodiments.

In at least some embodiments, detecting a predefined event 240 may include detecting that the current location of the mobile device is within the bounds of a previously defined geographic area. Many various techniques for detecting the current location of a mobile device are well-known to those of ordinary skill in the art, such as implementing location services or orientation sensors, such as orientation sensors 1096 described below with regard to FIG. 9, including using global positioning satellites (GPS), triangulation, or wireless network locations, may be implemented to detect the current location of a mobile device. In some embodiments, the mobile device may maintain a record or access a mobile device service (or a service provided by the content presentation and related event analyzer) which allows the mobile device to compare its determined location to a set of previously defined geographic areas (sometimes called geo-fenced locations) to determine whether the mobile device is within the bounds of one of the previously defined geographic areas. FIG. 4 illustrates an example of previously defined geographic area, according to some embodiments. Map view 410 illustrates a certain region containing multiple different building locations as outlined. For one such location, 420, geo-fence 430 has been indicated that includes the location 420. When, the current location of a mobile device 440 is determined within the bounds the geo-fenced location 430, the mobile device may detect a predefined event. For example, location 420 may represent a fast food restaurant. When mobile device location 440 is determined to be located within the bounds of the fast food restaurant 420, as defined by the geo-fence 430, the mobile device may detect a predefined event. This predefined event may later be connected to the presentation of content. For instance, if the user identifier linked to the mobile device determined to be in the fast food location was also connected to the presentation of advertisement content for the fast food location, then it may be determined to be likely that the owner/possessor/user of the mobile device may have visited the fast food restaurant location after being presented with the fast food restaurant commercial. Alternatively, in another example, the previously defined geographic area may be a geo-fence around a competitor's location, such as when a presentation event connects a user identifier to the presentation of content for one retailer and the mobile device is subsequently detected in a location for a competing retailer.

In some embodiments, the predefined event message may include an indication of the current location of the mobile device that when reported to a content presentation and related event analyzer or other server, system, or computing device may also allow the content presentation and related event analyzer to determine whether the current location is within the bounds of the previously defined geographic area and is, therefore, a predefined event.

In at least some embodiments, detecting a predefined event 240 may include receiving an indication of a purchase transaction associated with the user identifier linked to the mobile device. For example, a mobile device linked to a user identifier may implement near field communication (NFC) technology or other applications, hardware, or mobile services to make purchase transactions, such as for a clothing item purchase at a retailer. The mobile device linked to the user may receive an indication of the purchase transaction for the clothing item, and as the mobile device is linked to the user identifier, the mobile device may detect that the predefined event of a purchase transaction associated with the user identifier linked to the mobile device has occurred. Alternatively in another example, the mobile device may be used to access a website, such as a mobile website, to make a purchase, such as for the clothing item, and the mobile device may detect that the predefined event of a purchase transaction has occurred. Note, in some embodiments, another system or device may be used to make the purchase transaction associated with the mobile device. For instance, a user makes a purchase from a desktop computer of the clothing item, and the purchase is associated with a user identifier. The mobile device or a mobile device service may indicate the purchase transaction associated the user identifier linked to the mobile device for detection of the predefined event. Alternatively, in some embodiments a computing device, such as a desktop or laptop that detected the presentation event, may also be used to make a purchase and detect a predefined event. In one such example, a desktop computer may implement a software application configured to detect presentation events and configure browser "cookies" so that when purchases associated with detected content are made the browser cookies will link the user identifier to the purchase transaction. In at least some embodiments, the predefined event message indicating a purchase transaction may be generated and sent by a system or computing device owned or controlled by a merchant or other seller to a content presentation and related data analyzer.

Numerous other predefined events may also be detected by the mobile device. In response to detecting the predefined event 240, the mobile device or other computing device may send a predefined event message indicating the predefined event along with the user identifier linked to the particular mobile device for association with the predefined event to the network server 250. As discussed above with regard to the presentation event message, many formats of messaging and communication protocols, both standard, such as Hypertext Transfer Protocol (HTTP), or customized, may be used to package the information indicated in predefined event messages. Additional content presentation data or metrics relating to predefined events may be included in the predefined event messages. Alternatively, in some embodiments the mobile device may send a predefined event message including a user identifier linked to the mobile device with information, such as an indication of the mobile device's current location, an indication of a purchase, or an event time, which describes when the predefined event detected occurred. A presentation content and related event analyzer may then determine based on the included information that the predefined event message indicates a predefined event.

As noted above, the elements of the workflow included in area 202 may be performed by one or more computing devices in a variety of different combinations. For example, a presentation device may present the content 210, detect a presentation event 220, and send the presentation event message 230. However, in some embodiments, a presentation device may perform element 210 with a mobile device performing elements 220 and 230. Alternatively, a presentation device may perform elements 210 and 230, presenting and sending, while a mobile device may detect the presentation event 220. Similarly, the elements of the workflow included in area 204 may also be performed by one or more computing devices. For example, a mobile device may detect a predefined event 240 and send the predefined event 250 to a server, or another intermediary device, such as a presentation device, may send the detected predefined event to the server. Additionally, although the areas 202 and 204 are illustrated in FIG. 2 in a sequential ordering, the presentation of content 210, detection of a presentation event 220, and sending of a presentation event message 230, may also be performed in parallel for multiple presentations of content, presentation events, and predefined events. For example, a presentation device may perform the elements of area 202, while a mobile device may perform the elements of 204.

Workflow of Creating an Association of Received Content Presentation Data

In various embodiments, a content presentation and related event analyzer, such as content presentation and related event analyzer 150 discussed above with regard to FIG. 1, or other computing device, such as a network server or system 1000 described below with respect FIG. 9, may implement creating an association of a user identifier linked to a mobile device with the presentation of content. FIG. 5 illustrates a workflow of creating associations of received content presentation data, according to some embodiments. Note that in the following discussion the terms content presentation and related event analyzer or network server may be used to describe a device performing the illustrated workflow. However, such terms are not intended to be limiting as to the numerous other computing devices capable of implementing the illustrated workflow.

In various embodiments, a content presentation and related event analyzer may receive a presentation event message 510, such as a presentation event message discussed above with regard to FIG. 2, indicating a connection between a user identifier linked to a particular mobile device and a presentation of content on a presentation device. Multiple presentation event messages may be received for a single user identifier and/or multiple presentation event messages may be received for multiple user identifiers each linked to different mobile devices. Presentation event messages may be received in larger batch files or data structures of multiple presentation event messages or received together with multiple predefined event messages at periodic or aperiodic intervals. Presentation event messages may indicate different content and different forms of content, such as discussed above with regard to FIG. 1. A content presentation and related event analyzer may record the connection, such as in content presentation data storage 804 described below with regard to FIG. 8, between the presentation of the content and the user identifier linked to the mobile device 520 as indicated by the presentation event message. For example, a presentation message may indicate that a user identifier was presented with a particular commercial on a certain channel at a certain time and record in a database with entries connecting the user identifier, the commercial, the time of presentation, and the channel.

After recording the connection indicated by the received presentation event message 520, the content presentation and related event analyzer may receive a predefined event message 530 including a user identifier linked to the mobile device. Also discussed above with regard to FIG. 2, predefined event messages may include many formats of messaging and communication protocols, both standard, such as Hypertext Transfer Protocol (HTTP), or customized, that may be used to package the information indicated in predefined event messages. Additional information or metrics relating to predefined events may be included in the predefined event messages. Predefined events, discussed above as well, may be any action performed via the mobile device or the user identifier linked to the mobile device that may be attributed to the presentation of content, including, but not limited to, detecting when the mobile device is located within a certain previously defined area (e.g., a geo-fence), a purchase made via the mobile device (e.g., using near field communications (NFC)) or associated with the user identifier linked to the mobile device, determining a current device location, postings to social networks, sending text messages, downloading or viewing an application, or viewing a mobile website.

A content presentation and related event analyzer may then determine that the predefined event message indicates an event 535. In some embodiments, predefined event message itself may indicate that a predefined event occurred, for example, via a mobile device, without further analysis at the content presentation and related event analyzer. In some embodiments, however, the content presentation and related event analyzer may determine that the predefined event message indicates a predefined event based on information included in the predefined event message. For example, the predefined event message may include an indication of the current location of the particular mobile device. Based on this location information, the content presentation and related event analyzer may determine that the location is within the bounds of a previously defined geographic area (e.g., a geo-fence), and that a predefined event, (e.g., visiting a particular retail location) has been indicated. In another example, the predefined event message may include information that indicates a purchase. Based on this purchase information, the content presentation and related event analyzer may determine that the purchase is associated with a user identifier and, therefore, indicates a predefined event. In another example, the content presentation and related event analyzer may determine whether an event time, included as information in the predefined event message, is within a certain time threshold. If the event time is within the time threshold, then the content presentation and related event analyzer may determine that the predefined event message indicates a predefined event. As numerous other types of predefined events may occur, such as postings to social networks, sending text messages, downloading or viewing an application, or viewing a mobile website, along with varying methods for their detection, the above examples are not intended to be limiting.

The content presentation and related event analyzer, based on the user identifier indicated in the predefined event message, may determine one or more presentations of content connected to the user identifier 540. Such a determination may be implemented in many different ways as the connections between presentations of content and user identifiers may implemented in many different forms of data storage. For example, a content presentation and related event analyzer may record the connections as linked objects, mapping the connections by maintaining relationships between user identifier objects and content presentation event objects. Alternatively, multi-dimensional arrays or indexes may be maintained for content being monitored that logs as entries the user identifiers and presentation events recorded for the content. As techniques for mapping or storing information and the relationships between particular data points are well-known to those of ordinary skill in the art, the above examples are not intended to be limiting.

The content presentation and related event analyzer may then connect the predefined event with one or more presentations of content connected to the user identifier 550. Connecting the predefined event, such as recording or storing the predefined event, may be determined according to the form of data storage for user identifiers and presentations of content discussed above. Continuing the above example, a predefined event object may be linked to the user identifier linked to the determined one or more presentations of content. Whether a connection is made and to what presentations of content the connection is made may be based upon the predefined event detected. The entity, such as the content owner/publisher/distributer/provider or other interested third-party (e.g., a marketing agency), may specify to the content data collector the different filters and connections to be applied for content in response to particular predefined events received. In some embodiments, the content presentation and related event analyzer may connect the predefined event received within a certain period of time. For example, if a retailer is monitoring the presentations of content for a Christmas sale commercial for the retailer, and the received predefined event indicates that the mobile device linked to the user identifier was located in one of the retailers locations in February, then the retailer may wish to provide a time filter that limits connections for store visit predefined events to visits made before January. In some embodiments, the presentations of content monitored may be monitored for a group of different content, such as a group of commercials related to a particular advertising campaign. For example, if the user identifier is connected with several different commercials for the same toy at a particular toy store, the content presentation and related event analyzer may connect the predefined event with the multiple different commercials. As the different types of content measured may include advertisements or information concerning all kinds of products and services, numerous other different filters, connection rules, or other implementations for connecting predefined events may be implemented. As such, the above examples are not intended to be limiting.

In another example, in some embodiments, the predefined event message may indicate a current location of a mobile device. The content presentation and related event analyzer may determine whether the current location of the mobile device is within the bounds of a previously defined geographic area. The previously defined geographic area may be associated with one of the presentations of content, and the content presentation and related event analyzer may connect the predefined event with one or more presentations of content connected to the user identifier if the previously defined geographic area is associated with the one or more presentations of content connected to the user identifier, such as described in the example given above with regard to FIG. 3.

In at least some embodiments, the received predefined event message may, as discussed above with regard to FIG. 2, indicate a purchase transaction associated with user identifier.

Figures 6A, 6B:
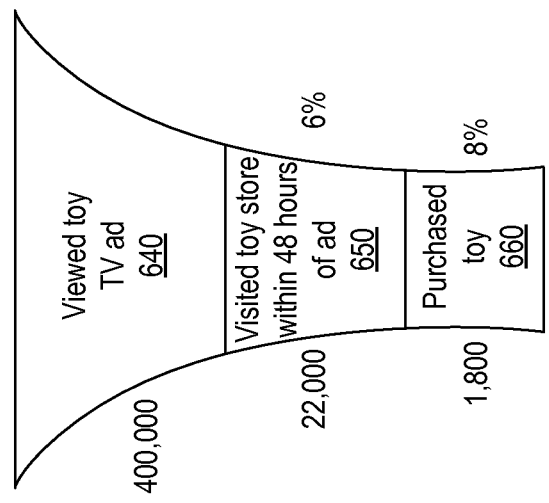
FIGS. 6A and 6B illustrate examples of different generated views of recorded connections, according to some embodiments.

The content data collector may, in some embodiments generate one or more views of the recorded connections 560. These generated views may describe, illustrate, demonstrate, or display the recorded connections in response to requests, in real-time, near real-time, or in various other periodic or a periodic intervals. The recorded connections may include many presentations of content, user identifiers, and predefined events, as elements 510 through 550 may be repeated multiple times for presentation event messages and predefined event messages. Recorded connections may, in some embodiments, indicate the number of unique user identifiers, and therefore mobile or computing devices, present during the presentation of content. Such indications may provide market researchers, analysts, and other interested parties, like those discussed above with regard to FIG. 1, with a more accurate number of users to whom the content was likely presented, such as the users possessing, owning, or operating those mobile or computing devices. For example, if during a television commercial, six mobile devices and their user identifiers are detected and recorded based on presentation event messages, an advertising agency using an analyzer client, such as analyzer client 160 discussed above with regard to FIG. 1, may determine that six users actually watched the television commercial, instead of merely knowing that content was presented. FIGS. 6A and 6B discussed below provide further examples of how such recorded connections may indicate similar marketing measurements.

In some embodiments, the generated views may display subsequent events as attributable to the presentation of content. The generated views may, in some embodiments, be updated to reflect the current number of recorded connections in the generated views. FIGS. 6A and 6B illustrate examples of different generated views of recorded connections, according to some embodiments. FIG. 6A, for example, provides the number of recorded connections with user identifiers in a table format for multiple presentations of content, such as fast food chain burger ad 610, cell phone product placement (during video content) 620, and interview with Music Celebrity 630. The table also includes the subsequent predefined event connections, store visits, and purchases. FIG. 6B illustrates recorded connections for a single content, toy television ad. The graphical view generated illustrates the visual connections between the number of user identifiers connected with presentations of the ad 640, to the number of store visits 650 (within a certain time threshold, 48 hours), and the number purchase toy transactions 660. The previous illustrations of generated views are merely given for example only, and are not intended to be limiting. Many different predefined events, presentations of content, or formats may be generated.

Example Embodiments

Figure 7A:
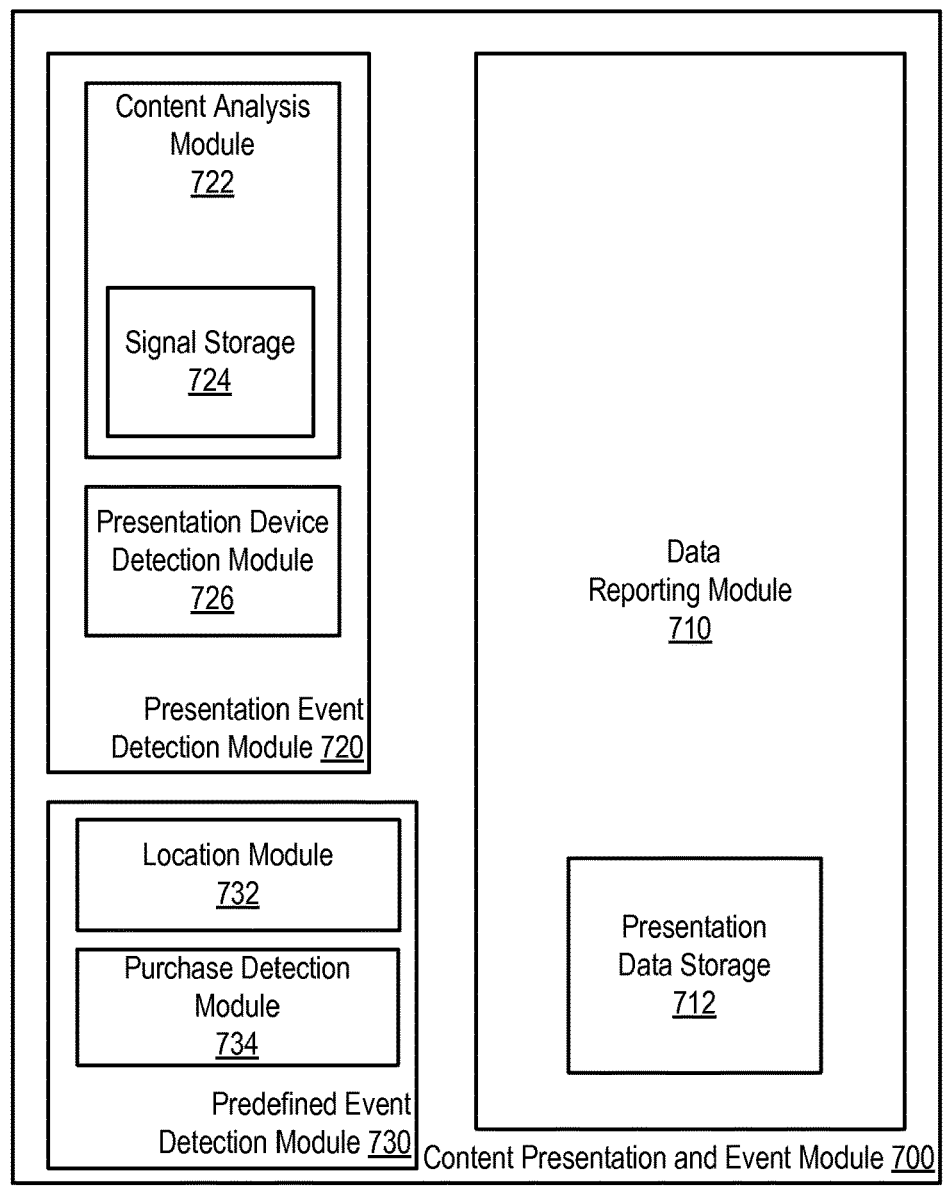
FIGS. 7A and 7B, illustrate examples of a content presentation and event modules, according to some embodiments.

FIG. 7A illustrates an example content presentation and event module, according to some embodiments. Mobile devices, such as those discussed above with regard to FIG. 1, or other computing devices, such as system 1000 discussed below with regard to FIG. 9, may implement content presentation and event module 700. Content presentation and event module 700 may, in some embodiments, be implemented by a non-transitory, computer-readable storage medium and one or more processors (e.g., CPUs and/or GPUs) of a computing device. The computer-readable storage medium may store program instructions that when executed by the one or more processors cause the computing device to perform in response to presentation of content on a presentation device, creating an association between the presentation of the content and a user identifier linked to a particular mobile device, wherein said creating comprises: detecting a presentation event indicating a connection between the user identifier linked to the mobile device and the presentation of the content on the presentation device; sending a presentation event message to a network server; subsequent to creating the association between the presentation of the content and the user identifier linked to the particular mobile device, detecting a predefined event via the mobile device; and in response to detecting the predefined event, sending a predefined event message indicating the event along with the user identifier linked to the particular mobile device for association with the predefined event to the network server, as described herein. Other embodiments of the module may be at least partially implemented by hardware circuitry and/or firmware stored, for example, in a non-volatile memory.

Content presentation and event module 700 may include a predefined event detection module 720. Predefined event detection module 720 may obtain content signals, such as signals described above with regard to FIG. 2, from a presentation device, such as presentation device 130 or from other modules or components implemented on the same device implementing content presentation and event module 700. Content analysis module 722 may identify receive signals, such as through optical sensors 1094, auditory sensors 1092, or wireless sensors 1098 described below in FIG. 9, and identify signals, such as described above with regard to FIG. 2, based on signals stored in signal storage 724 or the other methods described in FIG. 2. Note, that in alternative embodiments, another module device, or service may implement signal storage 724. Detected presentation events and related content presentation data may be sent to the data reporting module 710, which may then record the user identifier linked to a mobile device and the detected presentation event in presentation data storage 712. Predefined event detection module 720 may also be configured to implement a presentation device detection module 726 which may communicate with a presentation device to send a user identifier or other requested information. For example, as discussed above with regard to FIG. 2 at presentation device detection module 726 may receive content signals from a presentation device that indicate a presentation event.

Content presentation and event module 700 may implement predefined event detection module 730 to detect the various predefined events discussed above with regard to FIG. 2. For example, predefined event detection module may implement a location module 732. Location module 732 may implement one or more of the various methods discussed above with regard to FIGS. 2 and 4 to determine the current location of the mobile device. Location module 732 may be configured to receive device location data, such as GPS information, or other location information, from one or more components or modules implemented internally with or external to the device implementing content presentation and event module 700. In some embodiments, location module 732 may detect a predefined event to determine the current location of the implementing device and send the predefined event to the data reporting module 710.

In another illustrated example, predefined event detection module 730 may implement may implement purchase detection module 734. Purchase detection module 734 may be configured to detect a purchase transaction associated with a user identifier linked to a mobile device, such as described above with regard to FIG. 2. Purchase detection module 734 may obtain purchase information data that includes indications of purchases from internal components or modules on the implementing device, or from external sources. For instance, if the implementing device is a mobile device that relies upon a mobile device service, such as a mobile device service described above with regard to FIG. 1, to make purchases, then purchase information data may be obtained by the purchase detection module 734 from the mobile device service or local component communicating with the mobile device service that indicates a particular purchase has been made. Purchase detection module may send purchase indications to data reporting module 710.

Data reporting module 710 may also be implemented in content presentation and event module 700. Data reporting module 710 may receive presentation events, predefined events, and various other forms of content presentation data discussed above with regard to FIG. 1. Data reporting module 710 may also receive signals, messages or indications from predefined event detection module 720 that indicate a presentation event. Data reporting module 710 may then record the event in presentation data storage 712. Data reporting module 710 may also receive signals, messages or indications from predefined event detection module 730 indicating that the occurrence of a predefined event. Data reporting module 710 may then store the event in presentation data storage 712.

Data reporting module 710 may send presentation event messages, predefined events messages, and other presentation content data to a network server, such as presentation content data collector described in FIG. 1. In some embodiments, the content analytics reporting module may package information into standardized message objects, such as the presentation event messages and predefined event messages discussed above. This information may be sent as it is received, in single or multiple data structures or objects. Alternatively, the recorded events, user identifiers, indications, and other content presentation data or objects, such as presentation event messages or predefined event messages, may be sent together in batches, scheduled or unscheduled, at periodic or aperiodic intervals, or as needed or requested.

Note, FIG. 7A is provided as an illustration of one of many possible implementations of creating an association of a user identifier linked to a mobile device with the presentation of content and, as such, is not intended to be limiting. Different modules or only some of the modules depicted may be implemented in various embodiments on one or more computing devices.

Figure 7B:
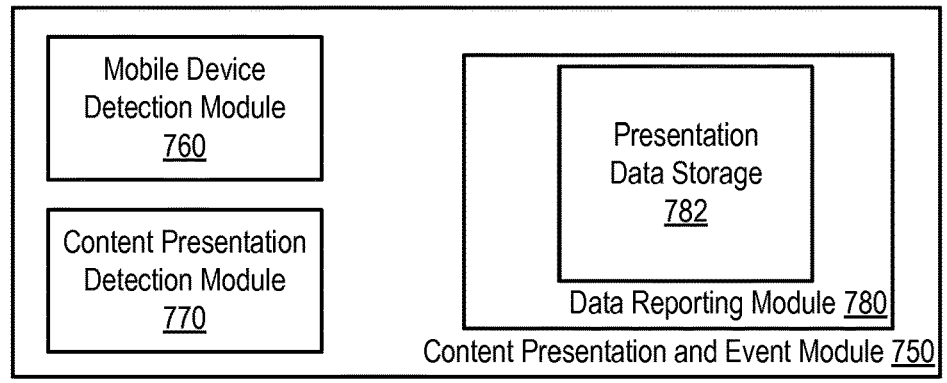

FIG. 7B illustrates another example content presentation and event module, according to some embodiments. Presentation devices, such as those discussed above with regard to FIG. 1, or other computing devices, such as system 1000 discussed below with regard to FIG. 9, may implement content presentation and event module 750. Content presentation and event module 750 may, in some embodiments, be implemented by a non-transitory, computer-readable storage medium and one or more processors (e.g., CPUs and/or GPUs) of a computing device. The computer-readable storage medium may store program instructions that when executed by the one or more processors cause the computing device to perform in response to presentation of content on a presentation device, creating an association between the presentation of the content and a user identifier linked to a particular mobile device, wherein said creating comprises: detecting a presentation event indicating a connection between the user identifier linked to the mobile device and the presentation of the content on the presentation device; sending a presentation event message to a network server; subsequent to creating the association between the presentation of the content and the user identifier linked to the particular mobile device, detecting a predefined event via the mobile device; and in response to detecting the predefined event, sending a predefined event message indicating the event along with the user identifier linked to the particular mobile device for association with the predefined event to the network server, as described herein. Other embodiments of the module may be at least partially implemented by hardware circuitry and/or firmware stored, for example, in a non-volatile memory.

Content presentation and event module 750 may implement a mobile device detection module 760. Mobile device detection module 760 may, as discussed above with regard to FIG. 2, broadcast signals detectable by a mobile device. A mobile device may respond with a user identifier, or other content presentation data, or event messages to be reported. Content presentation detection module 770 may also be implemented to detect presentation events on the presentation device. For example, the content presentation detection module may monitor metadata accompanying content for identifiers that the content for which presentation events should be detected. Presentation events, predefined events, or other content presentation data may be stored in presentation data storage 782. Data reporting module 780 may send presentation event messages, predefined event messages, or other content presentation data to a network server or content presentation and related event analyzer. This information may be sent as it is received, in single or multiple data structures or objects. Alternatively, the recorded events, user identifiers, indications, and other content presentation data or objects, such as predefined event messages or presentation event messages, may be sent together in batches, scheduled or unscheduled, at periodic or aperiodic intervals, or as needed or requested.

Note, FIG. 7B is provided as an illustration of one of many possible implementations of creating an association of a user identifier linked to a mobile device with the presentation of content and, as such, is not intended to be limiting. Different modules or only some of the modules depicted may be implemented in various embodiments on one or more computing devices.

Figure 8:
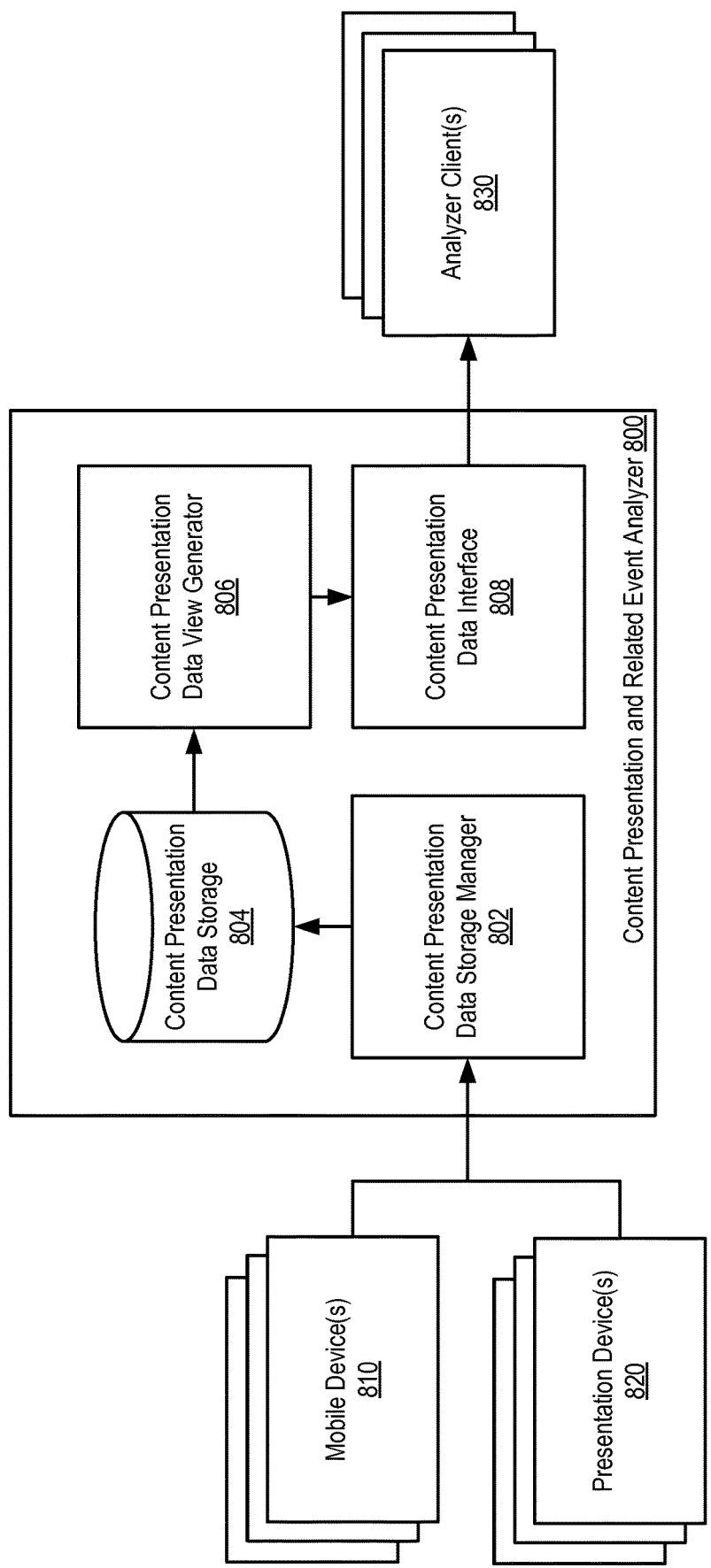
FIG. 8 illustrates an example content presentation and related event analyzer, according to some embodiments.

FIG. 8 illustrates an example content presentation and related event analyzer, such as content presentation and related event analyzer 150 discussed above with regard to FIG. 1, implementing the various methods discussed above with regard to FIG. 5. Mobile devices 810 and presentation devices 820 may send presentation event messages, predefined event messages, and other content presentation data or objects to content presentation and related event analyzer 800, which may record or connect the received event messages. Content presentation and related event analyzer 800 may implement a content presentation data storage manager 802 which receives presentation event messages, predefined event messages, and other content presentation data from mobile devices 810 and presentation devices 820. Content presentation data storage manager 802 may record connections between user identifiers and presentations of content indicated in presentation event messages in content presentation data storage 804. Content presentation data storage manager 802 may connect predefined events with presentations of content connected to user identifiers, as well as other content presentation data. Content presentation data view generator 806 may be implemented by content presentation and related event analyzer 800 to generate one or more views of recorded connections from content presentation data storage 804 according to the various methods discussed above with regard to FIGS. 5 and 6. The type or information in the generated view of connections may be specified be in a request from an analyzer client 830 to content presentation data interface 808. Content presentation data interface 808 may also send generated views of recorded connections or raw content presentation data to analyzer clients 830 or request an updated view from content presentation data view generator 806.

Note, FIG. 8 is provided as an illustration of one of many possible implementations of creating an association of a user identifier linked to a mobile device with the presentation of content and, as such, is not intended to be limiting. Different modules or only some of the modules depicted may be implemented in various embodiments on one or more computing devices.

Example System

Embodiments of creating an association of a user identifier linked to a mobile device with the presentation of content as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device 1082 such as a pad or tablet via which a user enters input via a stylus-type device and/or one or more digits.

In some embodiments, I/O interface 1030 may be coupled to sensor devices 1090. In some embodiments auditory sensors 1092 may be configured to receive audio data, convert audio data into an electrical signal, and transmit the electrical signal to a speaker or other device or application/module. In some embodiments, sensor devices 1090 may include optical sensors 1094. Optical sensors 1094 may be configured to receive light or other form of electromagnetic signal, convert the light or other signal data to data representing an image. Optical sensors 1094 may capture still images or video. In some embodiments, sensor devices 1090 may include orientation sensors 1096. In some embodiments, orientation sensors 1096 may be configured to include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of computer system 1000. In some embodiments, sensor devices 1090 may include wireless sensors 1098. Wireless sensors 1098 may be configured to communicate using a variety of radio and other wireless communication technologies, such as Bluetooth communications and near field communications (NFC).

In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 2010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of compressing analytics data according to recurring time periods for a network-based site as described herein are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement embodiments of creating an association of a user identifier linked to a mobile device with the presentation of content as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for using a mobile device to associate media content presentations with purchase-related events of a user of the mobile device, the method comprising:

detecting by a software application executed by a mobile device, a plurality of presentation events, each presentation event indicating a connection between a user identifier linked to the mobile device and a presentation of a respective different media content presentation on one or more televisions, each media content presentation promoting a respective different product or service and provided by a respective different retailer, wherein the software application identifies each media content presentation by matching audio content emitted by one of the televisions and received via a microphone of the mobile device to stored audio data accessible by the software application;

transmitting, by the software application to a network server, a plurality of presentation event messages, each presentation event message identifying one of the presentation events and including the user identifier and a media content identifier of the media content presentation indicated by the presentation event;

transmitting, by the software application to the network server, a plurality of predefined event messages, each event message identifying one of a plurality of geofence areas encountered by the mobile device and the user identifier, each geofence area being at a respective different retail establishment, and wherein each geofence area is detected by a location-tracking system executed by the mobile device, and wherein each geofence area is defined by the respective different retailer;

associating, by an analytical application executed on the network server, each of the predefined event messages with one or more of the presentation event messages by matching the user identifier included in each of the predefined event messages with the user identifier included in each of the one or more presentation event messages; and determining, by the analytical application, that an association between each of the predefined event messages and the one or more presentation event messages indicates whether the user viewing or listening to a selected one of the media content presentations visited the retail establishment of the retailer of the product or service promoted by the selected media content presentation and whether the user viewing or listening to the selected media content presentation visited one or more other retail establishment of one or more other retailers of products of services promoted by one or more others of the media content presentations.

2. The method of claim 1, wherein the software application further identifies each media content presentation by matching visual content from a signal emitted by one of the televisions and captured by an optical sensor of the mobile device to stored visual content accessible by the software application.

3. The method of claim 1, wherein each of the media content presentations is transmitted to the one or more televisions via a communication channel that is independent of the mobile device.

4. The method of claim 1, wherein each of the one or more televisions on which is presented a media content presentation promoting a product or service provided by a retailer is located in a location that is distant from a geofence area associated with that retailer.

5. The method of claim 1, wherein each of the televisions comprises an IPTV device.

6. The method of claim 1, wherein comparing the audio content with the audio data accessible by the software application comprises comparing the audio content with the audio data using an acoustic fingerprinting technique.

7. A non-transitory, computer-readable storage media, storing program instructions that when executed by at least one computing device, implement operations comprising:

detecting a plurality of presentation events, each presentation event indicating a connection between a user identifier linked to a mobile device and a presentation of a respective different media content presentation on one or more televisions, each media content presentation promoting a respective different product or service and provided by a respective different retailer, wherein the mobile device identifies each media content presentation by matching audio content emitted by one of the televisions and received via a microphone of the mobile device to stored audio data accessible by the mobile device;

transmitting, to a network server, a plurality of presentation event messages, each presentation event message identifying one of the presentation events and including the user identifier and a media content identifier of the media content presentation indicated by the presentation event;

transmitting to the network server, a plurality of predefined event messages, each event message identifying one of a plurality of geofence areas encountered by the mobile device, each geofence area being at a respective different retail establishment, and wherein each geofence area is detected by a location-tracking system executed by the mobile device, and wherein each geofence area is defined by the respective different retailer;

associating, each of the predefined event messages with one or more of the presentation event messages by matching the user identifier included in each of the predefined event messages with the user identifier in each of the presentation event messages; and determining that an association between each of the predefined event messages and the presentation event messages indicates whether the user viewing or listening to a selected one of the media content presentations identified in the presentation event message visited the retail establishment of the retailer of the product or service promoted by the identified media content presentation and whether the user viewing or listening to the selected media content presentation visited one or more other retail establishments of one or more other retailers of products of services promoted by one or more others of the media content presentations.

8. The non-transitory, computer-readable storage media of claim 7, wherein the operation of identifying each media content presentation comprises matching visual content from a signal emitted by one of the televisions and captured by an optical sensor of the mobile device to stored visual content.

9. The non-transitory, computer-readable storage media of claim 7, wherein each of the media content presentations is transmitted to the one or more televisions via a communication channel that is independent of the mobile device.

10. The non-transitory, computer-readable storage media of claim 7, wherein each of the one or more televisions on which is presented a media content presentation promoting a product or service provided by a retailer is located in a location that is distant from a geofence area associated with that retailer.

11. The non-transitory, computer-readable storage media of claim 7, wherein each of the televisions comprises an IPTV device.

12. The non-transitory, computer-readable storage media of claim 7, wherein the operation of comparing the audio content with the audio data accessible by the mobile device comprises comparing the audio content with the audio data using an acoustic fingerprinting technique.

13. A system configured to associate media content presentations with purchase-related events of a user of a mobile device, comprising:
   a mobile device comprising at least one processor and a non-transitory computer-readable storage medium storing program instructions of a software application that when executed by at least one processor of the mobile device implement operations comprising:
      detecting a plurality of presentation events, each presentation event indicating a connection between a user identifier linked to a mobile device and a presentation of a respective different media content presentation on one or more televisions, each media content presentation promoting a respective different product or service and provided by a respective different retailer, wherein the mobile device identifies each media content presentation by matching audio content emitted by one of the televisions and received via a microphone of the mobile device to stored audio data accessible by the mobile device;
      transmitting to a network server a plurality of presentation event messages, each presentation event message identifying one of the presentation events and including the user identifier and a media content identifier of the media content presentation indicated by the presentation event;
      transmitting to the network server a plurality of predefined event messages, each event message identifying one of a plurality of geofence areas encountered by the mobile device, each geofence area being at a respective different retail establishment, and wherein each geofence area is detected by a location-tracking system executed by the mobile device, and wherein each geofence area is defined by the respective different retailer; and
   a network server comprising at least one processor and a non-transitory computer-readable storage medium storing program instructions of an analytical application that when executed by at least one processor of the network server implement operations comprising:
      associating each of the predefined event messages with one or more of the presentation event messages by matching the user identifier included in each of the predefined event messages with the user identifier included in each of the presentation event messages; and
      determining that an association between each of the predefined event messages and the presentation event messages indicates whether the user viewing or listening to a selected one of the media content presentations identified in the presentation event message and whether the user visited the retailer of the product or service promoted by the selected media content presentation and whether the user viewing or listening to the selected media content presentation visited one or more other retail establishments of one or more other retailers of products of services promoted by one or more others of the media content presentations.

14. The mobile device of claim 13, wherein each of the media content presentations is transmitted to the one or more televisions via a communication channel that is independent of the mobile device.

15. The mobile device of claim 13, wherein each of the one or more televisions on which is presented a media content presentation promoting a product or service provided by a retailer is located in a location that is distant from a geofence area associated with that retailer.

16. The mobile device of claim 13, wherein each of the televisions comprises an IPTV device.

17. The mobile device of claim 13, wherein the operation of comparing the audio content with the audio data accessible by the mobile device comprises comparing the audio content with the audio data using an acoustic fingerprinting technique.

* * * * *